United States Patent [19]

Rutkowski

[11] Patent Number: 4,913,926
[45] Date of Patent: Apr. 3, 1990

[54] CURL FREE ION DEPOSITION LABEL PRINTING

[75] Inventor: Wayne L. Rutkowski, South Wales, N.Y.

[73] Assignee: Avery International Corporation, Pasadena, Calif.

[21] Appl. No.: 329,803

[22] Filed: Mar. 28, 1989

[51] Int. Cl.[4] .............................................. B05D 5/10
[52] U.S. Cl. .................................... 427/14.1; 101/489; 156/277; 156/278; 156/289; 427/256.0; 428/40
[58] Field of Search ................. 427/208.4, 208.8, 28.6, 427/261, 14.1, 256; 156/277, 278, 289; 428/40; 101/489

[56] References Cited

U.S. PATENT DOCUMENTS 4,494,129  1/1985  Gretchev ........................... 346/154

Primary Examiner—Bernard Pianalto
Attorney, Agent, or Firm—Poms, Smith, Lande & Rose

[57] ABSTRACT

Dual layer, pressure sensitive label sheets for ion deposition printing, use an adhesive on the back of the labels in the form of geometric patterns with narrow, adhesive-free bands between the geometric patterns. The patterns may be hexagonal or diamonds, for example, so that the edges of the die-cut labels will be held down; and the adhesive-free areas may be less than 1/16 inch, preferably in the other of 1/32 inch in width so that with the high pressures encountered in ion deposition printing, curl-free labels with high resolution printing is achieved.

14 Claims, 2 Drawing Sheets

CURL FREE ION DEPOSITION LABEL PRINTING

FIELD OF THE INVENTION

This invention relates to the ion deposition printing of multiple layer sheets, such as sheets of labels having pressure sensitive adhesive thereon mounted on backing sheets.

BACKGROUND OF THE INVENTION

Ion deposition printing is well known, and one of many U.S. Pat. Nos. describing ion printing apparatus is U.S. Pat. No. 4,494,129, granted Jan. 15, 1985 to Delphax Systems. Ion deposition printers may be purchased from various sources, including from C. Itoh Electronics Company, 2515 McCabe Way, P. 0. Box 19628, Irvine, Calif. 92713-9628.

Ion deposition printers provide an excellent printing capability, but have certain shortcomings. In this regard, it is noted that ion deposition printers apply relatively high levels of pressure between the output roller and the electrostatically chargeable drum as the toner is being applied to the sheet being printed. In the case of sheets of pressure sensitive labels which are fully coated with adhesive, and are mounted on backing sheets, ion deposition printing has the effect of curling up the edges and corners of the sheets, so that the sheets cannot practically be stacked, or used.

Accordingly, a principal object of the present invention is to provide a method for printing sheets of labels or similar materials mounted on backing sheets, by the ion deposition method; and a related object is to provide an improved dual thickness label-adhesive-backing sheet combination which may be used in ion deposition printers, without the curling problem discussed above.

SUMMARY OF THE INVENTION

In accordance with the present invention, a method for preparing curl-free printed sheet of labels adhered with pressure sensitive adhesive to backing sheets includes the steps of (1) preparing dual layer sheets of labels and associated backing sheets with a discontinuous pattern of adhesive on the labels with the pattern of adhesive being in the form of closely spaced geometric figures with a narrow space between the geometric figures of adhesive, and (2) printing onto the dual layer label sheets using an ion deposition type electrostatic printer, and (3) applying substantial pressure to the sheets in the course of the printing operation between an output pressure roller and an electrostatically chargeable drum employed in applying toner to the sheets.

In accordance with an additional feature of the invention, the geometric figures are preferably arranged so that at least some of the sides of the geometric figures are not parallel to the edges of the labels, so that die cutting of the labels on the backing sheets does not provide edges which are likely to fold up out of the plane of the dual layer sheets. The patterns are preferably in an hexagonal configuration, but other configurations, such as adjacent diamonds, could also be employed. The edges of the sheets may be provided with a narrow adhesive-free area.

In accordance with a further aspect of the invention, the adhesive is preferably a fairly resilient adhesive and not unduly hard, so that the high pressure of the output rollers used in the ion deposition printing process do not damage the label stock, or cause the adhesive pattern to deform the labels stock significantly; but wherein the adhesive is sufficiently resilient to expand or flex under the high pressure of the output rollers of the ion deposition printer, absorbing the stress, and maintaining the flat configuration of the dual layer sheet, so that high resolution printing takes place. Other objects, features, and advantages of the invention will become apparent from a consideration of the following detailed description and from the accompanying drawings.

DETAILED DESCRIPTION

Figure 1:
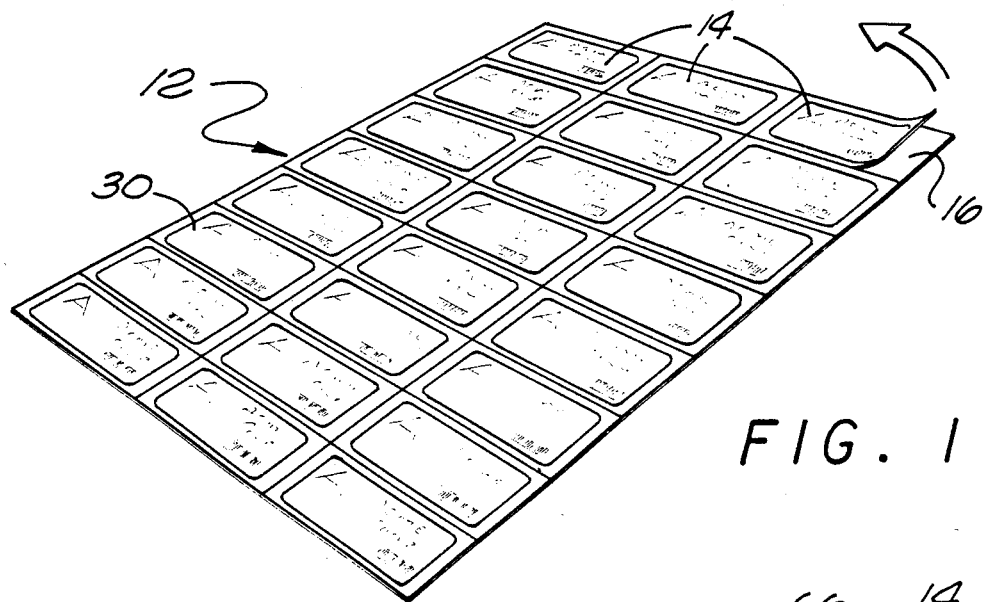
FIG. 1 is a perspective view of a dual layer sheet of printed labels mounted on a backing sheet.

Referring more particularly to the drawings, FIG. 1 shows a dual layer sheet 12 including an upper sheet made up of a large number of labels 14 which have been die-cut to be separate from one-another, and which are mounted on a backing sheet 16.

Figure 2:
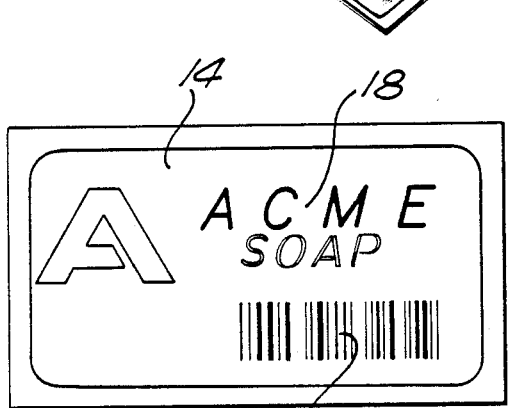
FIG. 2 is a top view of one of the labels from the sheet shown in FIG. 1.
Figure 3:
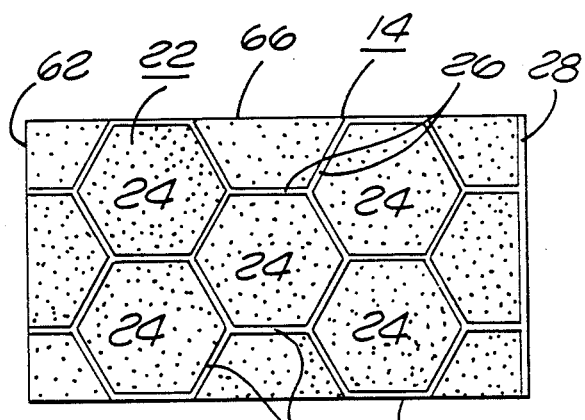
FIG. 3 is a rear view of the label of FIG. 2 showing the adhesive pattern.

FIGS. 2 and 3 are front and back views, respectively, of one of the labels 14 which has been removed from the backing sheet 16. More specifically, on the front of the label 14 as shown in FIG. 2, is some printing or advertising 18, and a bar code configuration 20.

On the back of the label 14, as shown in FIG. 3 is a hexagonal pattern of pressure-sensitive adhesive 22. The adhesive pattern is made up of a series of hexagons 24 which are approximately ⅛ of an inch across from side to side, and which are separated by narrow bands 26 of adhesive-free label stock. The narrow adhesive-free bands are less than 1/16 inch in width, and are preferably in the order of 1/32 inch wide.

Around the entire periphery of the dual layer sheet of FIG. 1, is an adhesive-free zone. In this regard, attention is drawn to the label of FIG. 3 in which an adhesive-free narrow border 28 is shown at the right-hand edge of the label. The label of FIG. 3 may, for example, be drawn from the area designated 30 in FIG. 1, lying in the middle of the left-hand side of the sheet labels, so that the adhesive-free area 28 lies along the left-hand side of the sheet 12 as shown in FIG. 1.

Figure 4A:
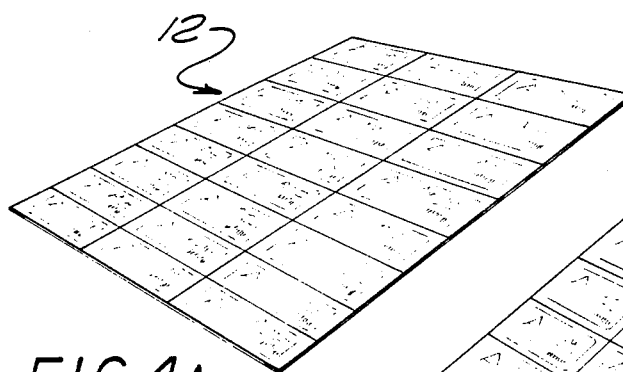
FIG. 4A shows a dual layer sheet in accordance with the invention following printing through an ion deposition printer.
Figure 4B:
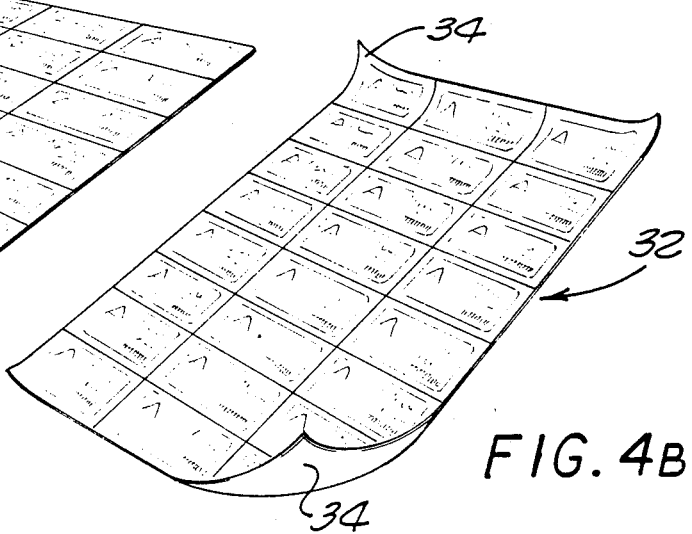
FIG. 4B shows a dual layer label sheet having continuous adhesive on the back of the label sheet, which has been curled up as a result of being printed in an ion deposition printer.

FIG. 4A shows a dual layer label sheet 12, of the present invention, and having an adhesive pattern as shown in FIG. 3, in which the label sheet 12, following printing, is entirely level and flat. In FIG. 4B, however, the dual layer label sheet 32 has a continuous layer of adhesive on the back of the labels between the label sheet and the backing sheet, and, following printing in an ion deposition printer, it curls up as indicated, particularly at the corners 34. This curling was found to be so significant that proper stacking of the printed sheet labels was not practical, nor was further mechanical processing of the sheets.

Figure 5:
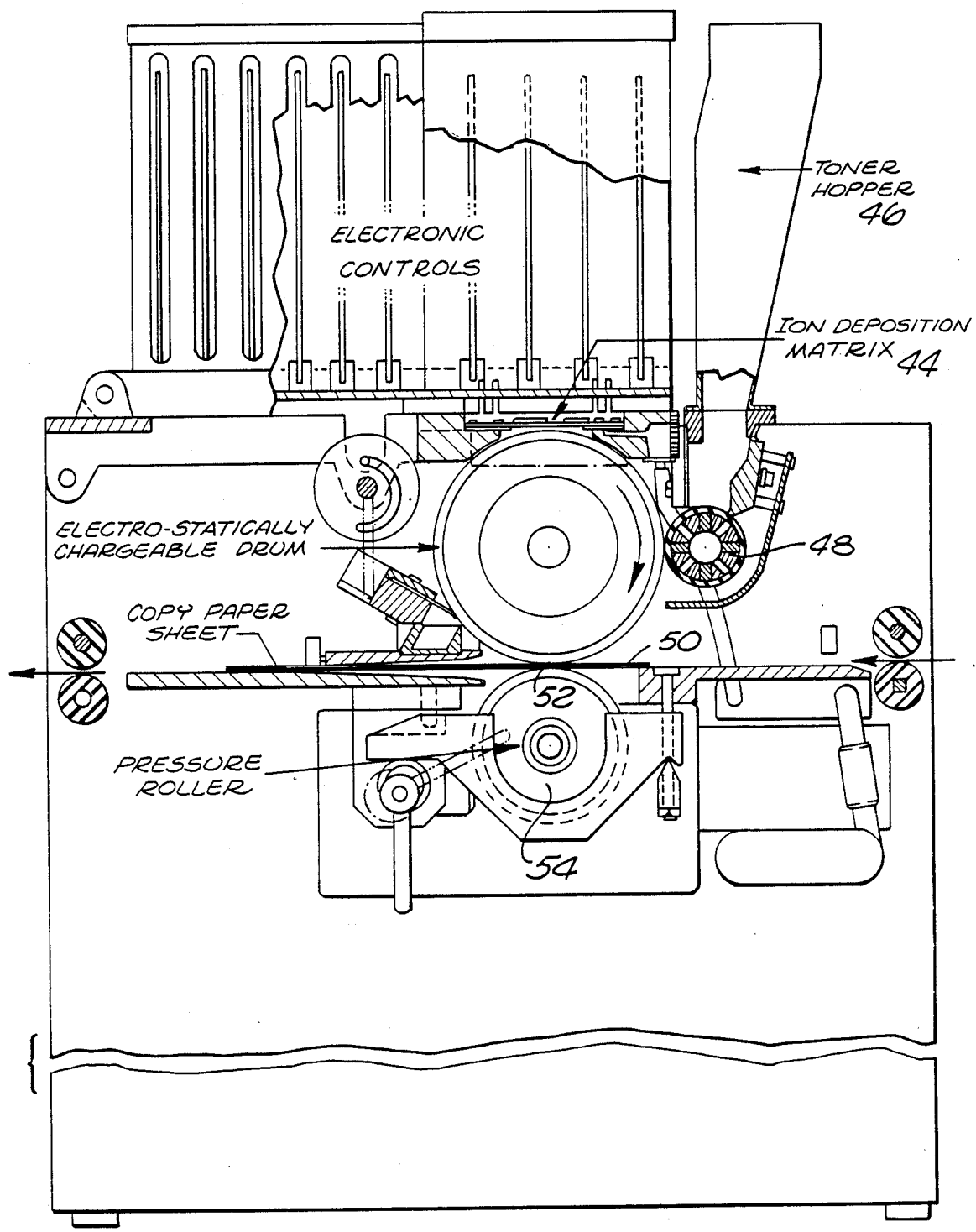
FIG. 5 is a schematic cross-sectional view of an ion deposition printer.

FIG. 5 is a diagrammatic showing of an ion deposition printer, of the type shown and described in some detail in U.S. Pat. No. 4,494,129, cited hereinabove. More particularly, with reference to FIG. 5, the electrostatically chargeable drum 42 is shown toward the center of FIG. 5, and the ion deposition matrix 44 is shown located immediately above the center of the drum 42. Following the electrostatic charging of selected areas on the drum 42 to form an image, toner from the toner hopper 46 is applied to the outer surface of the drum 42 via the toner applicator 48. The image produced by the application of toner to selected areas previously charged by the ion deposition matrix 44, is applied to the copy paper sheet 50 at point 52 where the pressure roller 54 bears against the drum 42. In the ion deposition process, moderately high levels of pressure, normally greater than 50 pounds per linear inch, and in some cases more than 100 pounds per inch, are present between the pressure roller 54 and the drum 42. It is this relatively high pressure which produces the curled copy paper sheets, as shown in FIG. 4B, when continuous adhesive is employed between the label sheet and the backing sheet. It is believed that the high pressure applied to the adhesive stresses the adhesive, deforming it to some extent, and causes the indicated deformation.

However, by utilizing a moderately resilient adhesive, and the narrow adhesive-free zones as shown at 26 in FIG. 3 of the drawings, the tension or strain produced by the high pressures at the nip area between the pressure roller 54 and the drum 42, may be accommodated, and printing accomplished while still producing flat output label sheets.

Various patterns of geometric areas of adhesive, with adhesive-free bands between the geometric areas, have been tried, and some configurations are superior to others. Thus, the hexagonal configuration shown in FIG. 3 is preferred. In this connection, it may be noted that the die-cut edges 62, 64 and 66 of the label 14 each have some zones along their length where adhesive is present, although in certain other areas along their length, the edge may be coincident with one of the adhesive-free bands. In some cases where rectangular patterns were tried, the die-cut edge would extend entirely along an adhesive-free zone, and under these conditions, occasionally the label edge would delaminate and interfere with the smooth feeding of the sheet. In addition, when very fine patterns were employed, particularly when relatively hard and unyielding adhesives were employed, interference with the smooth and even printing of the bar code was encountered, poor printing resolution resulted, with the result that some errors in the reading of the bar code occasionally occurred.

By way of example, one adhesive which was determined to be somewhat harder than desirable is the adhesive designated P-32 and available from Avery International Corporation, the assignee of the present invention. Typical adhesives which are more resilient and flexible, and which may preferably be employed in the implementation of the present invention include an adhesive made by Avery International Corporation, the assignee of the present invention, and designated No. P-39, and an adhesive made by Malcom Nickelmelt Company, of Lyndhurst, N.J., and designated Adhesive No. 1580. With regard to the coverage of the adhesive, it is desirable that the adhesive have relatively full coverage, and only have relatively narrow breaks in the coverage. In this regard, as mentioned above, the hexagonal pattern of adhesive, as shown in FIG. 3 of the drawings, includes hexagons having a size in which the distance between opposite flat sides is approximately ⅛ of an inch, and wherein the narrow spaces or bands between hexagons is approximately one thirty-second of an inch. It is believed that, as printing takes place, the resilient adhesive is squeezed by the high pressure at the nip between the pressure roller 54 and the dr. 42, so that the adhesive advances at least partially into the narrow, normally adhesive-free bands between the hexagons; and printing of patterns, such as the bar code 20, shown in FIG. 2, is uniform and readable. However, in the event that the space between the geometric patterns is larger, for example, greater than 1/16 inch, or in the event that a harder adhesive is employed, the bar code printing is less regular, and occasional errors will occur in the reading of the bar code information in the course of marketing.

Concerning the adhesive pattern, it may be noted that the ratio of adhesive covered areas to adhesive-free areas is substantially greater than 10 to 1. More generally, it is considered that a ratio of more than 5 to 1 is preferred. Adhesive configurations using small circular areas or squares of adhesive were also tested, and they had good curl-free properties, but the printing resolution was not as good as would be desired. The squares used in the test were about ¼ inch square and were spaced apart by about ¼ inch. The circular areas were about ⅛ inch in diameter, and were spaced apart by about ⅛ inch.

In conclusion, it is to be understood that the foregoing description and the accompanying drawings relate to one illustrative embodiment of the invention. Various changes and modifications may be made without departing from the spirit and scope of the invention. Thus, the present invention is applicable to other printing methods where high pressures are applied to the multilayer label sheets. In addition, it is to be understood that different geometric figures, such as diamonds, for example, could be used in place of the hexagonal pattern shown in the drawings. Further, the width of the narrow spaces between the geometric patterns may vary, in accordance with the type of adhesive which is employed, with slightly wider spacing being employed, when the adhesive is softer and more resilient, and somewhat narrower spacing may be used when the adhesive is less soft and resilient. Accordingly, the present invention is not limited to the apparatus and method precisely as described in detail hereinabove, and as shown in the drawings.

What is claimed is:

1. A method for preparing curl-free printed sheets of labels adhered with pressure sensitive adhesive to backing sheets, comprising the steps of:

preparing a composite sheet including a backing sheet, and a sheet of labels having a discontinuous patterned layer of adhesive on the labels releasably adhering said label sheet to said backing sheet, with the patterned layer of adhesive being in the form of closely spaced geometric figures with a narrow adhesive-free band between the geometric figures of adhesive;

printing onto said composite sheets in an ion deposition type electrostatic printer; and applying substantial pressure to said sheets in the course of said printing operation between an output pressure roller and an electrostatically chargeable drum employed in applying toner to said sheets.

2. A method as defined in claim 1 wherein said adhesive is applied in a hexagonal pattern.

3. A method as defined in claim 1 wherein a hot melt type adhesive is applied to said labels.

4. A method as defined in claim 1 wherein said adhesive is applied in said pattern to areas of said labels other than at a narrow area at the edges of said sheets which are adhesive free.

5. A method as defined in claim 1 wherein the pressure is applied at a level of at least 50 pounds per linear inch along the nip between said roller and said drum.

6. A method as defined in claim 1 wherein said adhesive pattern is applied in the form of geometric figures wherein at least some of the edges of said geometric figures are not parallel to the edges of said labels.

7. A method as defined in claim 1 wherein bar codes are printed onto said labels, with the bar code being oriented substantially parallel to at least one of the edges of said labels.

8. A method as defined in claim 1 including the step of die cutting said label sheet to form individual labels secured to said backing sheets.

9. A method as defined in claim 1 including the step of applying a relatively resilient adhesive to the label sheet, and resiliently compressing said adhesive to expand into the space between patterns, as pressure is applied to said sheets, to absorb the strain without permanently deforming and curling said dual layer sheets, and promoting high resolution printing of said labels.

10. A method as defined in claim 1 wherein said adhesive is applied in patterns having adhesivefree bands less than 1/16 inch wide between said geometric figures.

11. A method as defined in claim 1 wherein said adhesive is applied in patterns having adhesivefree bands about 1/32 inch wide between said geometric figures.

12. A method for preparing curl-free printed sheets of labels adhered with pressure sensitive adhesive to backing sheets, comprising the steps of:
preparing a composite sheet including a backing sheet, and a sheet of labels having a discontinuous patterned layer of adhesive on the labels releasably adhering said label sheet to said backing sheet, with the patterned layer of adhesive being in the form of closely spaced geometric figures with a narrow adhesive-free band between the geometric figures of adhesive;
printing onto said composite sheets in an ion deposition type electrostatic printer;
applying substantial pressure to said sheets in the course of said printing operation between an output pressure roller and an electrostatically chargeable drum employed in applying toner to said sheets; and
said method including the steps of applying a relatively resilient adhesive to the label sheet, and resiliently compressing said adhesive to expand into the space between patterns, as pressure is applied to said sheets, to absorb the strain without permanently deforming and curling said dual layer sheets, and promoting high resolution printing of said labels.

13. A method as defined in claim 12 wherein said adhesive is applied in patterns having adhesivefree bands less than 1/16 inch wide between said geometric figures.

14. A method as defined in claim 12 wherein said adhesive pattern is applied in the form of geometric figures wherein at least some of the edges of said geometric figures are not parallel to the edges of said labels.

* * * * *